US010652332B2

(12) United States Patent
Laursen et al.

(10) Patent No.: US 10,652,332 B2
(45) Date of Patent: May 12, 2020

(54) SYSTEM, METHOD, AND APPARATUSES FOR DYNAMIC AUTHORIZATION

(71) Applicant: Oracle International Corporation, Redwood Shores, CA (US)

(72) Inventors: Darrel Laursen, Pleasanton, CA (US); Yang Liu, Beijing (CN); Antonia M. Garcia, Dublin, CA (US); Xia Rao, Beijing (CN)

(73) Assignee: Oracle International Corporation, Redwood Shores, CA (US)

( * ) Notice: Subject to any disclaimer, the term of this patent is extended or adjusted under 35 U.S.C. 154(b) by 128 days.

(21) Appl. No.: 16/030,700

(22) Filed: Jul. 9, 2018

(65) Prior Publication Data

US 2020/0014751 A1 Jan. 9, 2020

(51) Int. Cl.
*H04L 29/08* (2006.01)

(52) U.S. Cl.
CPC .......... *H04L 67/1097* (2013.01); *H04L 67/06* (2013.01); *H04L 67/32* (2013.01)

(58) Field of Classification Search
CPC ........ H04L 67/22; H04L 67/32; H04L 67/06; H04L 67/1097; H04L 67/2842
See application file for complete search history.

(56) References Cited

U.S. PATENT DOCUMENTS

| 7,266,605 | B2 * | 9/2007 | Vasandani | G06F 21/31 707/999.009 |
| 7,434,257 | B2 * | 10/2008 | Garg | G06F 21/6218 726/21 |
| 8,719,903 | B1 * | 5/2014 | Kilday | G06F 21/62 726/4 |
| 8,973,157 | B2 * | 3/2015 | Kilday | G06F 21/62 709/229 |
| 9,596,312 | B2 * | 3/2017 | Ahrens | H04L 67/22 |
| 10,021,069 | B1 * | 7/2018 | Elliott | H04L 41/0823 |
| RE47,772 | E * | 12/2019 | Diamond | |
| 2012/0290445 | A1 * | 11/2012 | Wilson | G06Q 10/06312 705/27.1 |

(Continued)

OTHER PUBLICATIONS

Packaging Custom Web Server Assets, IBM Knowledge Center, available on internet at https://www.ibm.com/support/knowledgecenter/en/SSZLC2_8.0.0/com.ibm.commerce.developer.doc/tasks/tdppackaging_custom_web_server.htm, Accessed on Jan. 17, 2018, 3 pages.

(Continued)

*Primary Examiner* — Michael C Lai
(74) *Attorney, Agent, or Firm* — Kilpatrick Townsend & Stockton LLP (57) ABSTRACT

Systems and methods are provided for dynamically authorizing access to content stored on a front-end system by one or more applications hosted on a remote back-end system. The content stored on the front-end system may be static files. The front-end system may store content in distinct content storage locations. Each content storage location may correspond to a respective application hosted by the back-end system. In one embodiment, there may be multiple back-end systems each hosting one or more applications. Each application on the back-end system may employ operation logic to determine authorization to a content storage location associated with the application.

20 Claims, 7 Drawing Sheets

(56) References Cited

U.S. PATENT DOCUMENTS

2015/0242597 A1* 8/2015 Danciu ............... G06F 21/10
                                                    726/30
2016/0285882 A1* 9/2016 Brunn ................ H04L 63/102
2018/0144106 A1* 5/2018 Cholas ................ G06F 21/00

OTHER PUBLICATIONS

Protecting Static Files, MojoPortal, available on internet at https://www.mojoportal.com/protecting-static-files, Accessed on Jan. 17, 2018, 3 pages.

Serving Authenticated Static Files with Django, The Blog of Zachary Voase, available on internet at http://zacharyvoase.com/2009/09/08/sendfile/, Sep. 8, 2009, 4 pages.

Serving Static Files—App Engine flexible environment for Node.js docs, Google Cloud, available on internet at https://cloud.google.com/appengine/docs/flexible/nodejs/serving-static-files, Accessed on Jan. 17, 2018, 3 pages.

Anderson, Working with static files in ASP.NET Core, Microsoft Docs, available on internet at https://docs.microsoft.com/en-us/aspnet/core/fundamentals/static-files, Apr. 7, 2017, 13 pages.

Chow, Serving Protected Static Content Using Nginx for Speed and Rails Server for Authentication, Coderwall, available on internet at https://coderwall.com/p/o0alkg/serving-protected-static-content-using-nginx-for-speed-and-rails-server-for-authentication, Feb. 25, 2016, 7 pages.

* cited by examiner

FIG. 1

| Group Identifier 305 | Content Identifier 310 | Content Location 315 |
|---|---|---|
| Group Identifier 1 | G1document | Directory 205 -- Sub Directory 205A |
| | G1sheet | Directory 205 -- Sub Directory 205C |
| | G1chart | Directory 205 -- Sub Directory 205D |
| Group Identifier 2 | G2chart | Directory 215 -- Sub Directory 215A |
| | G2htmldata | Directory 215 -- Sub Directory 215B |
| | G2document | Directory 220 |
| | video.mp4 | Directory 205 -- Sub Directory 205B |
| | audio.mp3 | Directory 205 -- Sub Directory 205C |

SYSTEM, METHOD, AND APPARATUSES FOR DYNAMIC AUTHORIZATION

TECHNICAL FIELD

The present disclosure relates to dynamically authorizing access to content stored within a front-end system based on application logic present in a back-end system.

BACKGROUND

Back-end systems have long been used to store operation logic and underlying content associated with that operation logic. However, in some instances, back-end systems must transmit and process voluminous amount of data related to content requests (e.g., authentication functionalities, authorization functionalities, content storage, content transmission, and etc.). These operations may often create a bottleneck when multiple systems utilize the same back-end systems. Furthermore, back-end systems may unnecessarily utilize a large portion of a network's bandwidth distributing content to different web servers. It is desirable to securely and efficiently distribute content associated with remotely stored operation logic.

BRIEF SUMMARY

In some embodiments, systems and methods are provided for dynamically authorizing access to content stored on a front-end system by one or more applications hosted on a remote back-end system. The content stored on the front-end system may be static files. The front-end system may store content in distinct content storage locations. Each content storage location may correspond to a respective application hosted by the back-end system. In one embodiment, there may be multiple back-end systems each hosting one or more applications. Each application on the back-end system may employ operation logic to determine authorization to a content storage location associated with the application.

The front-end system may receive a request for content from a user device. The request may include a user identifier and a content identifier. The front-end system may, via a configuration file, determine one or more content storage locations associated with the requested content. The front-end system may, via the content identifier, further determine an application associated with the requested content. The front-end system may transmit the user identifier and the content identifier to the associated application hosted on the back-end system. The application, upon receipt of the user identifier and content identifier, may apply operation logic to determine if a user associated with user identifier is authorized to access content associated with the content identifier. After the determination, the application may generate and transmit, to the front-end system, an authorization response indicating that the user associated with the user identifier is authorized to access content associated with the content identifier. The front-end system may retrieve the content associated with the content identifier from the one or more content storage locations and transmit the content to the user device.

In one embodiment, the request for content submitted to the front-end system by the user device may comprise log-in information identifying log-in parameters. The front-end system may perform an authentication process based on the received log-in information. In one embodiment, the front-end system may compare the received log-in information with previously received log-in information. In circumstances when the log-in information is validated by the front-end system, an authentication cookie is created. The authentication cookie may comprise the user identifier, the content identifier, and authentication information. The authentication information may indicate that a user device associated with the user identifier or a user of the user device associated with the user identifier has been authenticated. The authentication cookie may be transmitted to the application associated with the content identifier. The application may then use the authentication cookie to generate an authorization response associated with the user identifier contained in the authentication cookie and send the authorization response to the front-end system. The front-end system may subsequently retrieve the content associated with the content identifier from the one or more content storage locations and transmit the content to the user device.

Techniques are provided for dynamic authorization to access content on a front-end system based on operation logic implemented by applications on a remote back-end system. The disclosed methods and systems are an improvement to current data transfer systems and data transfer methods because (for example) it allows data to be sent using less bandwidth and network resources. Typically, content associated with an application and the application itself or the operation logic invoked by the application are stored together in a back-end system. Thus, whenever a user device communicates with a front-end system to request content, the content must be sent from the back-end system to the front-end, and then from the front-end system to the user device. The described techniques provide a front-end system that stores content controlled by different applications and authorizes access to the stored content based on operation logic present in a remote back-end system. Each application may be controlled by a different client, which enables the front-end system to host a plurality of content controlled by different clients. The described techniques allow the same security as typical systems but increase the speed of data transfer as the content no longer needs to go from back-end system to front-end system. Instead, the data controlled by different clients may be sent directly from the front-end system to the user device which increases data transmission efficiency, improves use of network resources, and improves data transmission speeds.

DETAILED DESCRIPTION

In the following description, for the purposes of explanation, specific details are set forth in order to provide a thorough understanding of embodiments of the invention. However, it will be apparent that various embodiments may be practiced without these specific details. The figures and description are not intended to be restrictive.

Network Overview

Figure 1:
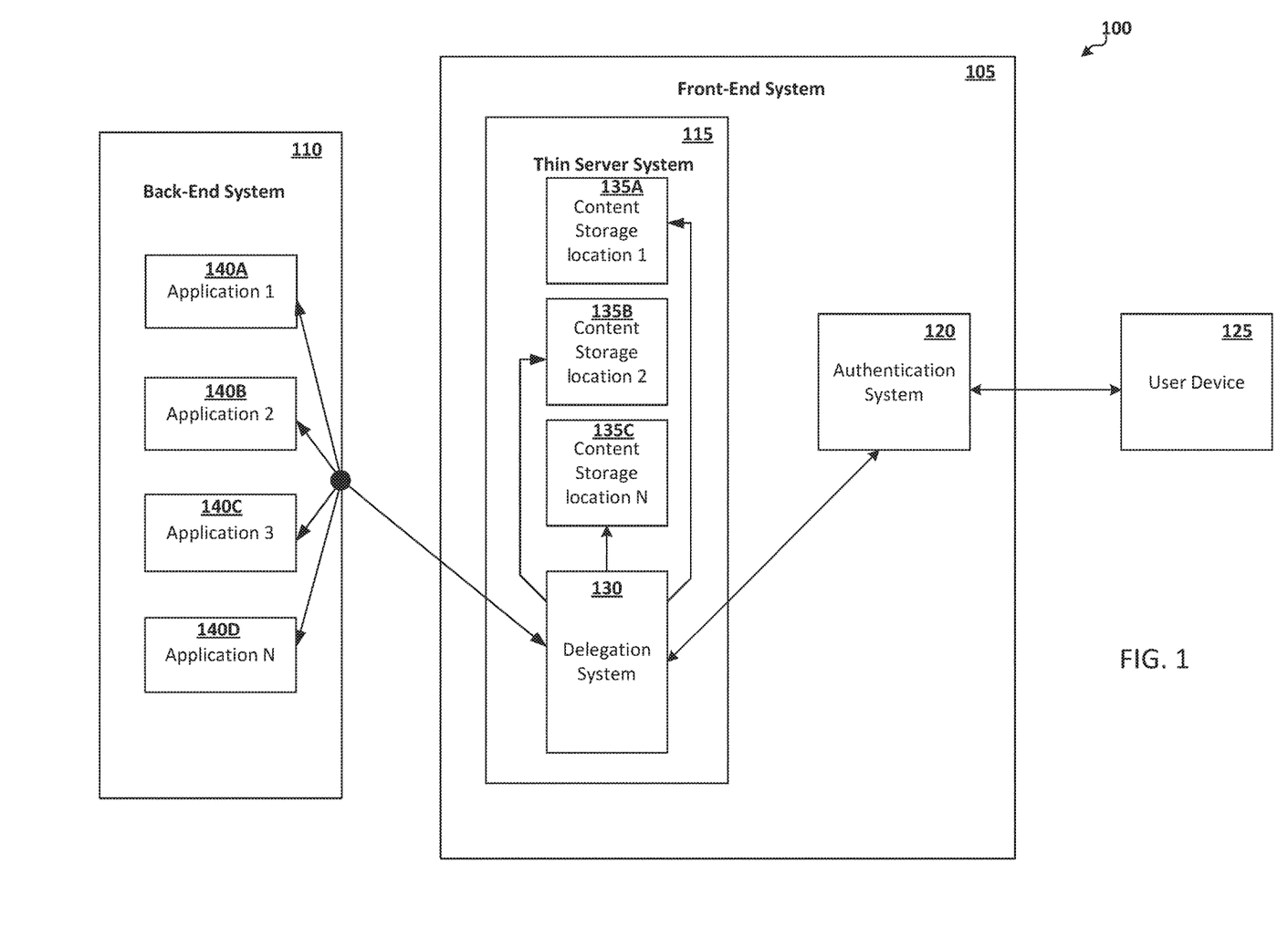
FIG. 1 illustrates an exemplary interactive system for implementing one or more embodiments described within the disclosure.

FIG. 1 illustrates exemplary an interactive system 100 in accordance with one or more embodiments describes in the disclosure. Interactive system 100 comprises one or more front-end systems 105, one or more back-end systems 110, and one or more user devices 125. Front-end system 105 may be connected to back-end system 110 by one or more wired or wireless connections to facilitate the transfer of data between front-end system 105 and back-end system 110. The wired or wireless connections may be implemented by any type of network familiar to those skilled in the art that can support data communications using any of a variety of commercially-available protocols, including without limitation TCP/IP (transmission control protocol/Internet protocol), SNA (systems network architecture), IPX (Internet packet exchange), and the like. For example, front-end system 105 may be connected to back-end system 110 via a local area network (LAN), a wide-area network, the Internet, a wireless network (e.g. a network operating under any of the Institute of Electrical and Electronics (IEEE) 802.11 suite of protocols, Bluetooth®, and/or any other wireless protocol); and/or any combination of these.

Front-end system 105 may be connected to user device 125 by one or more wired or wireless connections to facilitate the transfer of data between front-end system 105 and user device 125. The wired or wireless connections may be implemented by any type of network familiar to those skilled in the art that can support data communications using any of a variety of commercially-available protocols, including without limitation TCP/IP (transmission control protocol/Internet protocol), SNA (systems network architecture), IPX (Internet packet exchange), and the like. For example, front-end system 105 may be connected to user device 125 via a local area network (LAN), a wide-area network, the Internet, a wireless network (e.g. a network operating under any of the Institute of Electrical and Electronics (IEEE) 802.11 suite of protocols, Bluetooth®, and/or any other wireless protocol); and/or any combination of these.

Front-end system 105 may comprise thin server system 115 and authentication system 120. Thin server system 115 may be implemented by one or more thin servers. A thin server may be a lightweight server that contains enough hardware and software to support a limited amount of functions, such as those functions associated with storing and sending content, as described herein. In comparison to a general-purpose server or a fat server, a thin server may contain less hardware capabilities and/or less software capabilities. A thin server may offload computationally expensive functions, such as authentication, authorization, and the like to other systems. For example, a thin server may run an abbreviated version of a general operating system (e.g. a trimmed down version of Windows®), as opposed to a general-purpose computer running a standard version of a general operating system. In one embodiment, thin server system 115 may provide functionalities associated with the storing and the distribution of content with other functionalities, such as authorization and authentication being performed by other parts of interactive system 100. In one embodiment, by supporting a limited set of operations, thin server system 115 may be less costly than a traditional server system and may also perform a limited set of operations faster than a traditional server system as the thin server system does not have any unnecessary software, hardware or other features that may hinder its specific operations.

Thin server system 115 may comprise a plurality of content storage locations (i.e. 135A-135C) and delegation system 130. The plurality of content storage locations may store content associated with one or more applications hosted by back-end system 110. For example, back-end system 110 may host an a cloud-based application that may present a requesting device with a cloud-based webpage. In such an example, thin server system 115 may store in a content storage location the content needed for the requesting device to generate the cloud-based webpage (e.g., images, hmtl files, etc.). Each application in back-end system 110 may control access to one or more corresponding content storage locations in thin server system 115. In one embodiment, different entities may control the applications hosted by back-end system 110. Thus, the plurality of content storage locations may be associated with a plurality of different companies, persons, and/or entities. Each storage content location may be private, such that is not publicly accessible. Also each content storage location may be not accessible to other applications and/or back-end systems associated with other content storage locations within front-end system 105. In one embodiment, each storage content location is encrypted using a different encryption means (e.g., a different key and/or different algorithm). In one embodiment, each storage content location is password protected, such that a password provided by a corresponding application may be used by front-end system 105 to access a corresponding storage content location. The plurality of content storage locations within thin server system 115 may only be accessible by one or more parts of thin server system 115, such as delegation system 130. The storage content locations may be implemented by non-volatile memory (such as read-only memory (ROM), flash memory, etc.). In one embodiment, thin server system 115 may be implemented by one or more web servers.

Delegation system 130 may delegate authorization operations from thin server system 115 to one or more applications hosted on back-end system 110. In one embodiment, thin server system 115 may lack the functionality to determine if a user associated with a user identifier indicated in a request for content is authorized to access the requested content. In such an embodiment, thin server system 115 may lack the processing ability to determine authorization to access content and/or thin server system 115 may lack the operation logic to determine authorization to access content. The operation logic may be present in back-end system 110 or another remote system. Delegation system 130 may receive a request for content (e.g., from user device 125 or from authentication system 120) that includes a content identifier, a group identifier, a user identifier, and/or authentication information. The content identifier may identify content requested as well as an application associated with the content. In one embodiment, the group identifier may be included in the request for content. The group identifier may identify a plurality of content with a common characteristic, such as being controlled by the same application, being located in the same directory or sub-directory, and the like. The group identifier may be used in lieu of providing a numerous amount of content identifiers. In one embodiment, delegation system 130 may store a group identifier look-up table such that when a group identifier is received, delegation system 130 may query the look-up table to identify a plurality of content (and corresponding content identifiers) associated with the group identifier.

The user identifier may identify a user and/or a user device associated with a user. The authentication information may include authentication information generated by another system (e.g., authentication system 120). The authentication information may indicate to delegation system 130 that a prior determination has been made that the user device (or a user associated with the user device) associated with user identifier is whom it claims to be (i.e., authenticated). In one embodiment, authentication information may be included in an authentication cookie generated by authentication system 120. In one embodiment, authentication information may be omitted.

Delegation system 130 may utilize a configuration file to identify one or more content storage locations associated with the content identifier. Delegation system 130 may send a user identifier and content identifier as part of an authorization request to the associated one or more applications to determine if the user identifier is authorized to access content identified by the content identifier. When delegation system 130 receives an authorization response from the one or more applications, it may store the authorization response in one or more internal memory sets indexed by a user identifier. The storage of authorization responses may allow delegation system 130 to independently identify an authorization. Delegation system 130 may be implemented by one or more processing units and one or more sets of memory.

Authentication system 120 may authenticate one or more users and/or one or more user devices. In one embodiment, authentication system 120 receives a content request prior to delegation system 130 and may perform one or more authentication processes prior to sending delegation system 130 an authentication cookie. In one embodiment, authentication system 120 may receive, from user device 125, log-in information associated with a user or a user device. For example, log-in information may include, a password, a hardware identifier, biometric information, and/other authentication information. Authentication system 120 may compare the received log-in information to previously stored log-in information to determine if a user and/or user device is authenticated. In one embodiment, if a user and/or user device is positively authenticated, authentication system 120 may send an authentication cookie with authentication information indicating a positive authentication to delegation system 130. In one embodiment, if a user and/or user device is not authenticated, then no authentication cookie is sent to delegation system 130. If delegation system 130 does not receive an authentication cookie, then (in some instances) delegation system 130 does not delegate an authorization request to back-end system 110. Authentication system 120 may include one or more web servers to interface communications with user device 125. In one embodiment, authentication system 120 may be separate and external from front-end system 105.

Back-end system 110 may include a plurality of servers that host a plurality of applications (140A-140D). Each hosted application may apply and execute operation logic and processes based on received content identifiers, group identifiers, user identifiers, and/or authentication information. For example, back-end system 110 may host a cloud-based application for presenting a user device with a web-based result. In such an example, the cloud-based application may receive, from delegation system 130, an authorization request comprising a user identifier, content identifier, and/or authentication information. The cloud-based application may reference internal operation logic to determine if a user associated with the received user identifier is authorized to access content identified by the content identifier. In response to the authorization determination, the cloud-based application may generate an authorization response and transmit the authorization response to delegation system 130. In cases of a positive authorization determination, delegation system 130 may, via a configuration file, locate content associated with the content identifier. Once the content has been located, delegation system 130 may send the content to user device 125 for subsequent rendering and displaying within a web page in order to produce the web-based result. In one embodiment, the content sent to the user device may include an html file and image files that when processed by user device 125 cause user device 125 to render and display a web page.

In one embodiment, each application 140A-140D may be controlled by or associated with different clients. A client may be a company, organization, individual, or group of individuals. For example, a client may be a content provider that provides a streaming service to one or more user devices. In such an instance, the client may control, for example, application 140B, which may be an application for providing one or more audio/video streams to user devices. In one embodiment, each client may have a different server within back-end system 110. In one embodiment, one or more clients may control different applications located on a same server within back-end system 110.

Back-end system 110 may contain a group identifier look-up table such that when a group identifier is received, one or more applications in back-end system 110 may query the look-up table to identify a plurality of content (and corresponding content identifiers) associated with the group identifier.

User device 125 may be a device used by a user to access content stored in one or more content storage locations internal to front-end system 105. User device 125 may run one or more web browser applications that communicate with authentication system 120. In one embodiment, user device 125, via a web browser application, sends a content request including a user identifier, content identifier, group identifier and/or log-in information to authentication system 120. Authentication system 120 may subsequently authenticate that the user or user device is who or what it claims to be. If positively authenticated, authorization system 120 creates a cookie and forwards the cookie to delegation system 130. Subsequently, if delegation system 130 receives an authorization response that indicates a user or user device associated with the content request is authorized to access the content then front-end system 105 sends user device 125 the requested content. User device 125 may then render and display the requested content.

User device 125 may be a portable handheld device, a mobile phone, a smart phone, a tablet, a wearable device, or stationary device running one or more operating systems. Although only one user device 125 is depicted in FIG. 1 it is possible to implement a plurality of user devices.

Back-end system 110 and authentication system 120 may include one or more processing units and one or more sets of memory. The one or more processing units can be implemented as one or more integrated circuits, such as single-core or multicore processors. In one embodiment, the processing unit(s) may also be implemented as a quad-core processing unit formed by integrating two dual-core processors into a single chip. In various embodiments, the processing unit(s) can execute a variety of programs in response to program code and can maintain multiple concurrently executing programs or processes. Through suitable programming, the processing unit(s) can provide various functionalities described within this disclosure.

The memory implemented by back-end system 110 and authentication system 120 may be volatile (such as random access memory (RAM)) and/or non-volatile (such as read-only memory (ROM), flash memory, etc.). The RAM may contain data and/or program modules that are immediately accessible to and/or presently being operated and executed by the processing unit. In some implementations, the memory may include multiple different types of memory, such as static random access memory (SRAM) or dynamic random access memory (DRAM). The memory may also be a tangible computer-readable storage medium for storing the basic programming and data constructs that provide the functionality of some embodiments described by this disclosure. Software (programs, code modules, instructions) that when executed by the processing unit provide the functionality described by this disclosure.

Content Storage Locations

Figure 2:
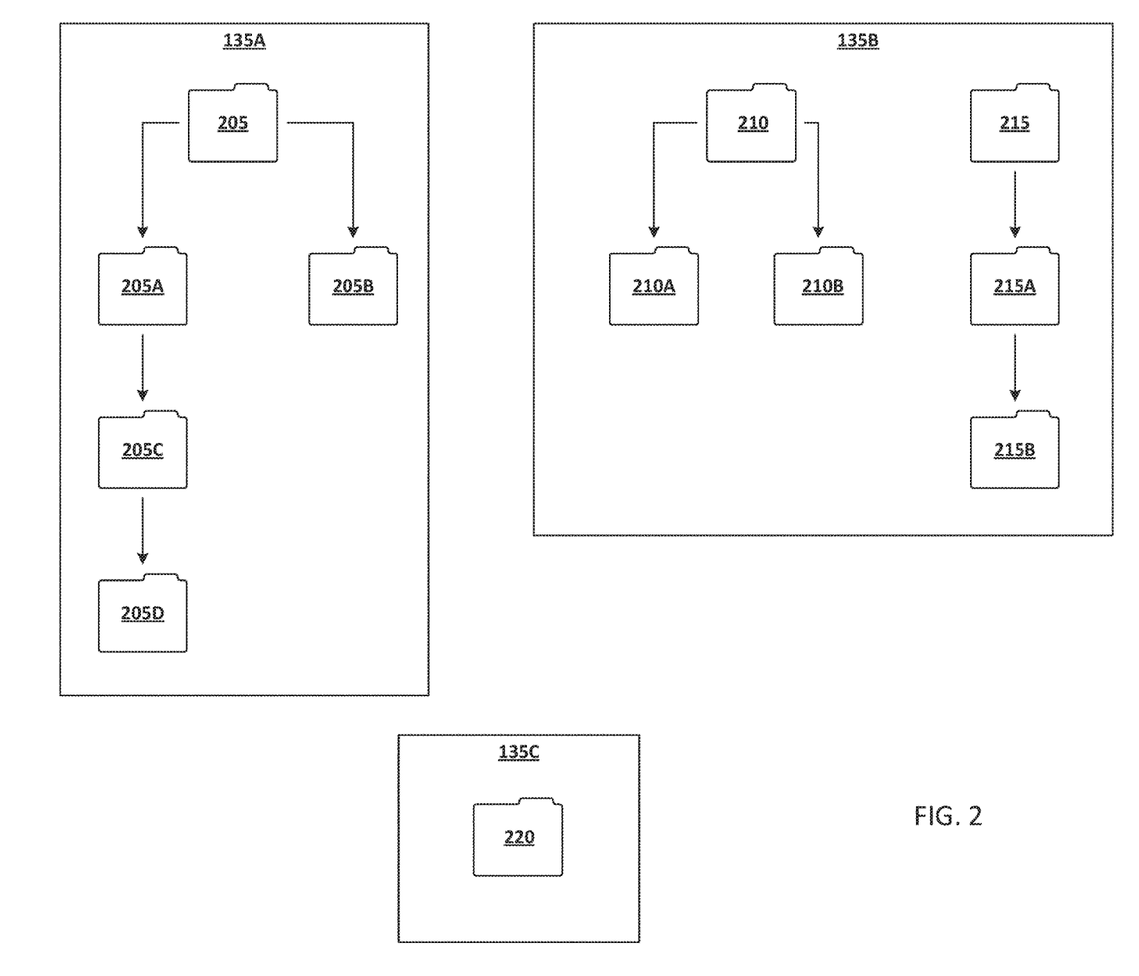
FIG. 2 illustrates exemplary content storage locations within a thin server system according to one or more embodiments described within the disclosure.

FIG. 2 illustrates a plurality of content storage locations according to one or more embodiments of the disclosure. Each content storage location may contain a hierarchy such that each content storage location may comprise one or more directories and each of the one or more directories may have one or more sub-directories. Content storage location 135A comprises directory 205 and sub-directories 205A-205D. In one embodiment, a sub-directory may be a secondary sub-directory tertiary sub-directory, quaternary sub-directory, and so forth, such that it is possible to have a plurality of nested directories. As illustrated in FIG. 2, content storage location 135A comprises directory 205. Directory 205 has two nested sub-directories: secondary sub-directory 205A and secondary sub-directory 205B. Secondary sub-directory 205A comprises tertiary sub-directory 205C, and tertiary sub-directory 205C comprises quaternary sub-directory 205D.

Each directory, regardless of whether it is a sub-directory, may include one or more pieces of content and/or one or more nested sub-directories. For example, secondary sub-directory 205A may comprise a plurality of video files, image files, hmtl files, document files, as well as tertiary sub-directory 205C. In one embodiment, a directory or sub-directory may comprise one or more static files. A static file may be content that can be delivered to user device 125 without having to be generated, modified, or substantially processed. A static file may be constant and remain the same. For example, primary directory 210 may store content to reproduce a web page, and content within primary directory 210 may be static files, such as images that are displayed within the web page to every user device that accesses the web page. In one embodiment, a web page may contain dynamic content. The dynamic portions of the web pages may be provided by another remote system (e.g. back-end system 110) such that static portions of the web page are transmitted from thin server system 115 to user device 125 and dynamic portions of the web page may be provided by a different remote system (e.g., back-end system 110). User device 125 may then generate the web page based on the static and dynamic portions received from two different sources.

Each directory may require different authorization parameters. Each directory may be associated with an application hosted on back-end system 110 such that an application may authorize access to content stored in a corresponding directory. In one embodiment, authorization parameters may be in a hierarchical form such that if authorization is granted to a primary directory then authorization is also granted to any sub-directories. In such an embodiment, if authorization is given to directory 205, then authorization is also given for sub-directories 205A-205B. However, if authorization is given to a sub-directory, authorization may not be automatically given for a parent directory. For example, authorization may be given for quaternary sub-directory 205D but not secondary sub-directory 205A or tertiary sub-directory 205C. Similarly, authorization may be given to secondary sub-directory 205B, but not to sub-directories 205A, 205C, or 205D.

Configuration File

Figure 3:
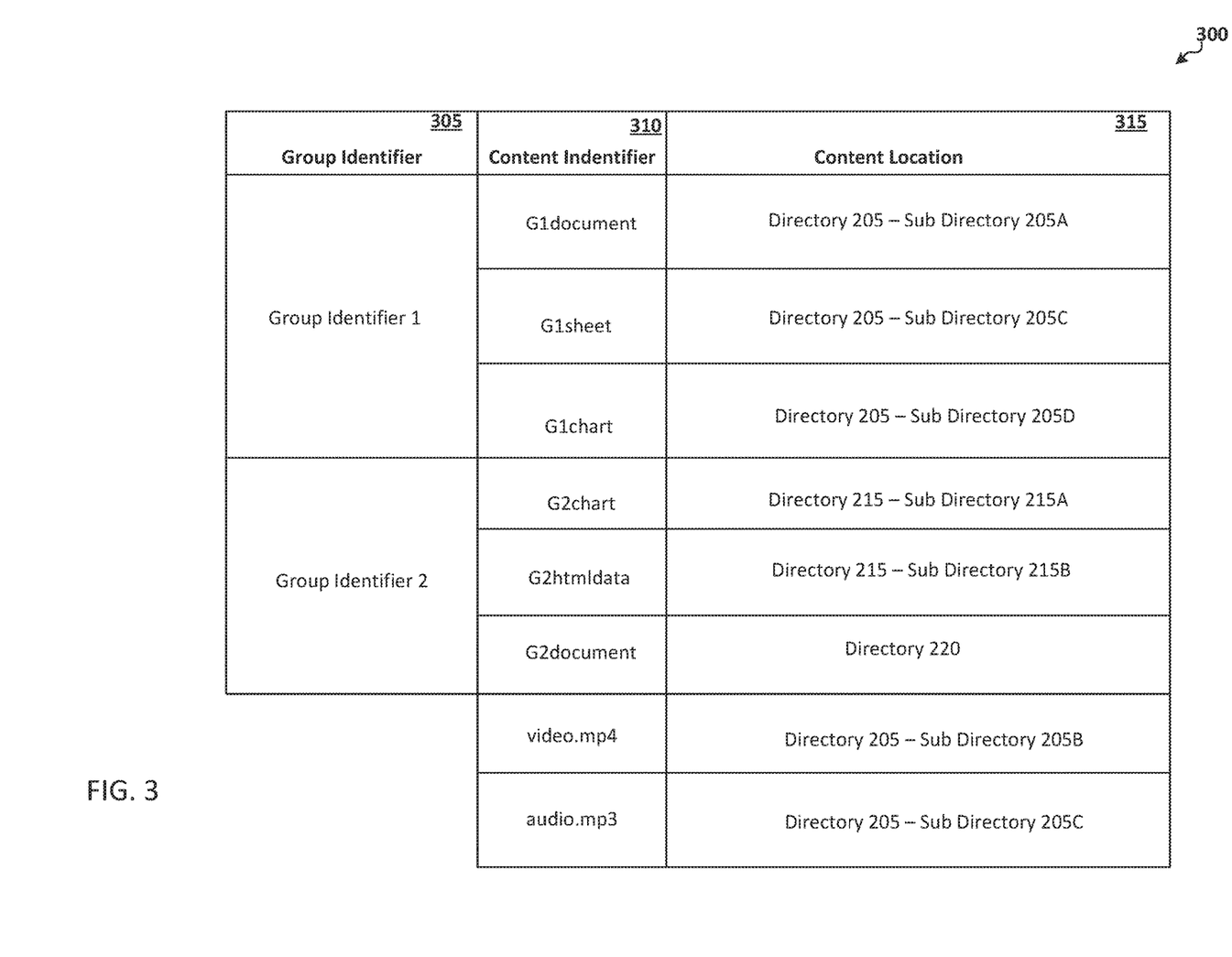
FIG. 3 illustrates an exemplary configuration file for implementing one or more operations according to one or more embodiments described within the disclosure.

FIG. 3 illustrates exemplary configuration file 300 in accordance with one or more embodiments describes in the disclosure. Configuration file 300 may be a data file, schema, or other form of data that may be utilized by delegation system 130 to identify one or more content storage locations associated with one or more received content identifiers. Configuration file 300 may be stored in one or more memory sets internal to delegation system 130 or thin server system 115. Configuration file 300 may comprise group identifier column 305, content identifier column 310, and content location column 315. Group identifier column 305 may comprise one or more group identifiers. The group identifiers may be previously received from one or more applications hosted on back-end system 110. Each group identifier may link to one or more content identifiers in content identifier column 310. In one embodiment, when a new application is introduced to interactive system 100 (e.g., a new application is hosted on back-end system 110) the application may send group and content identifiers and corresponding content to delegation system 130. Delegation system 130 may then generate one or more directories and sub-directories to store the received content. Subsequently, delegation system 130 may generate configuration file 300 based on the received group and content identifier, received content, and generated content storage locations.

Content identifier column 310 may identify of one or more pieces of content. In some embodiments, a content identifier may be associated with a group identifier. For example, group identifier 1 may be associated with content identifiers G1document, G1sheet, and G1chart. In one embodiment, each piece of content indicated in content column 310 may be data that can be utilized to produce content identified by an associated group identifier. For example, group identifier 1 may identify content for generating and displaying a web page associated with an application hosted on back-end system 110. In such an example, the content identifiers G1document, G1sheet, and G1chart may point to the content document.doc, sheet.xlsx, and chart.jpg respectively, which may be static files that can be used to generate and display the web page.

In one embodiment, content identifiers may not have a corresponding group identifier. For example, the content identified by video.mp4 and audio.mp3 (as illustrated in FIG. 3) do not have a corresponding group identifier. In such an embodiment, video.mp4 and/or audio.mp3 may be stand-alone static files (or other types of files) that can be delivered to user device 125. For example, content identifiers linked to group identifier 2 may indicate content that is needed to produce an application graphical user interface (GUI) associated with an application hosted by back-end system 110. On the other hand, content identified by video.mp4 and audio.mp3 may not identify content needed to produce the GUI, but instead may identify content that can be used on its own. For example, audio.mp3 may identify an mp3 file which can be used by software on user device 125 to produce an audio track. Such an audio track may be a stand-alone file capable of being utilized without additional files sent from front-end system 105.

Content location column 315 may indicate a directory or sub directory where a piece of content is located. Each piece of content may have a unique content identifier and each piece of content can be stored in a directory or a subdirectory. In one embodiment, when a new application is introduced to interactive system 100, the application may indicate authorization levels for each piece of content. Delegation system 130 may use the received authorization levels to determine the directory hierarchy associated with a content identifier. For example, content identified by G1document may have a first authorization level, content identified by G1sheet may have a second authorization level, and content identified by G1chart may have a third authorization level such that a first authorization level comprises the second and third authorization levels and the second authorization level comprises the third authorization level. Delegation system 130 may then store content identified by G1document in secondary sub-directory 205A, content identified by G1sheet in tertiary sub-directory 205C, and content identified by G1chart in quaternary sub-directory 205D. In one embodiment, delegation system 130 may use nested directories to indicate hierarchical authorization such that if a user device is authorized to access secondary sub-directory 205A it is also authorized to access tertiary sub-directory 205C and quaternary sub-directory 205D. By nesting subdirectories based on authorization level, delegation system 130 may store less authorization credentials in internal memory, which may reduce the internal memory requirements of delegation system 130.

Exemplary Processes and Operations

Figure 4:
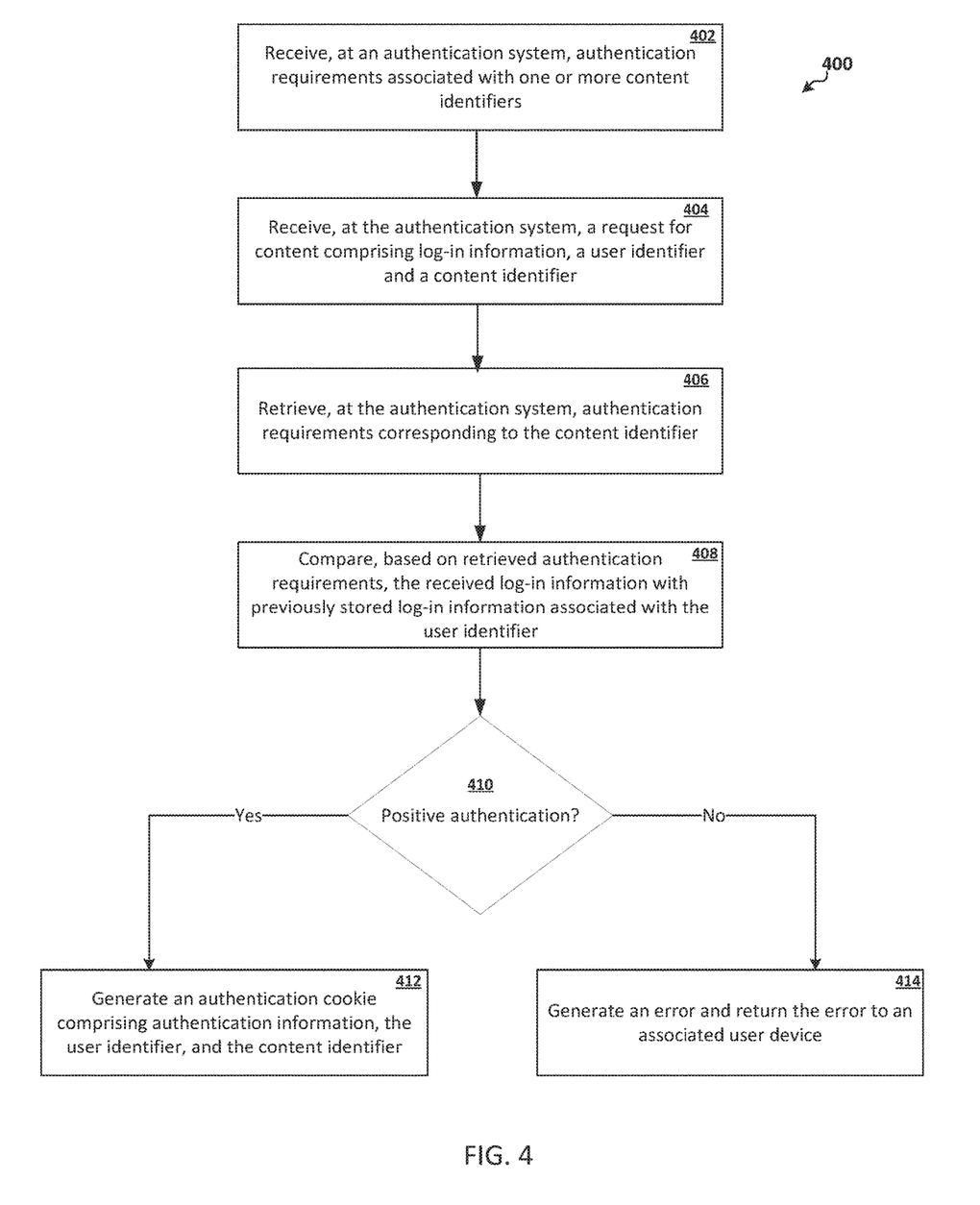
FIG. 4 illustrates an exemplary process according to one or more embodiments described within the disclosure.

FIG. 4 illustrates exemplary process 400 performed by one or more components of interactive system 100. In one embodiment, process 400 may be a process performed by authentication system 120 for authenticating a user and/or user device and subsequent generation of an authentication cookie.

At 402, authentication system 120 receives authentication requirements associated with one or more content identifiers. Interactive system 100 may handle content requests associated with many different applications. Each of these applications may have different user authentication requirements. For example, a first application hosted by back-end system 110 may only require a basic user authentication, such as by an alphanumeric password. In such an example, a second application hosted by back-end system 110 may require a more advanced form of user authentication, such as biometric authentication or two-factor authentication. In one embodiment, whenever an application is introduced to interactive system 100 the application may specify, to authentication system 120, authentication requirements. The authentication requirements may outline a specific process for authenticating any users or user devices requesting content associated with an application. For example, authentication requirements may require authentication of a user or a user device by password, biometric information, two factor authentication, and the like.

Authentication system 120 may also receive, from one or more applications hosted by back-end system 110, content identifiers associated with an application. For example, an application may send content identifiers that identify content associated with the application along with its authentication requirements. Authentication system 120 may store content identifiers and authentication requirements for each application hosted in back-end system 110. A content identifier may be an numerical, alphanumerical, filepath, or other indicator that when received by one or more parts of interactive system 100 may be used to identify one or more pieces of content.

In one embodiment, authentication system 120 may receive authentication requirements associated with an application hosted by back-end system 110 and/or a specific content storage location. For example, a first application may control a first content storage location within front-end system 105. The first application may transmit to authentication system 120 authentication requirements for any content stored in the first content storage location.

At 404, authentication system 120 may receive, from user device 125, a request for content comprising log-in information, a user identifier, and a content identifier. The request for content may be a request for any content that is provided via authorization from one or more applications hosted by back-end system 110. The user identifier may identify a user of user device 125 or user device 125 itself. In one embodiment, a user identifier may include a hardware identifier associated with user device 125, a username associated with a user of user device 125, and the like. In one embodiment, the request for content may include a hypertext markup language (HTML) request.

At 406, authentication system 120 may retrieve authentication requirements corresponding to the received content identifier. As described at 402, authentication system 120 stores content identifiers and authentication requirements associated with each application hosted by back-end system 110. Authentication system 120 may compare the received content identifier to a plurality of stored content identifiers to determine which application is associated with the received content identifier. Once the application is identified that is associated with the content identifier, authentication system 120 may retrieve previously stored authentication requirements associated with the identified application.

At 408, authentication system 120 may compare, based on the retrieved authentication requirements, the received log-in information with previously stored log-in information associated with the user identifier. The retrieved authentication requirements may detail an authentication process to authenticate a user and/or a user device. The log-in information that is received from user device 125 at 402 is compared to log-information in accordance with authentication requirements. For example, if the authentication requirements require authentication system 120 to authenticate a user of user device 125 via biometric means, then authentication system 120 may compare received log-in information (i.e. received biometric information) with previously stored log-in information (i.e. previously received biometric information). In another example, if the authentication requirements require authentication system 120 to authenticate user device 125 via a hardware identifier then authentication system 120 may compare received log-in information (i.e. received hardware identifier) with previously stored log-in information (i.e. p previously received hardware identifier).

At 410, authentication system 120 may determine if there is a positive authentication according to the retrieved authentication requirements. If there is a positive authentication then process 400 moves to 412.

At 412, authentication system 120 may generate an authentication cookie comprising authentication information, the user identifier, and the content identifier. The authentication information may include an indication of a positive authentication as well as the authentication requirements that were met in determining the positive authentication. In one embodiment, the receipt of an authentication cookie is itself an indication of a positive authentication. In one embodiment, authentication information may indicate a level of authentication. For example, an application may specify in their authentication requirements that a user may be authenticated by basic means, such as a password and by a more advance means, such as by biometric means. In instances when a user is only authenticated through basic means, the authentication information may indicate a basic level of authentication. The level of authentication may be subsequently used by an application when determining an authorization response after receiving the authentication cookie.

If, at block 410, it is determined that there is not a positive authentication, then process 400 moves to 414. At 414, authentication system 120 may generate an error and return the error to user device 125. In one embodiment, the error may be returned in an HTML response. The HTML response may be received by user device 125 and cause user device 125 to render an indication of the negative authentication. A negative authentication determination may be achieved if the request for content does not contain proper log-in information. For example, a request for content may contain a password as log-in information but the retrieved authentication requirements may require biometric information as log-in information. In such a scenario, authentication system 120 would reach a negative authentication determination. Authentication system 120 may generate an error containing a message indicating one or more reasons for a failed authentication determination. In one embodiment, once the error is transmitted to user device 125, user device 125 may be presented with a prompt from authentication system 120 to re-enter log-in information. In one embodiment, an authentication cookie may be generated such that the authentication information indicates a negative determination.

Figure 5A:
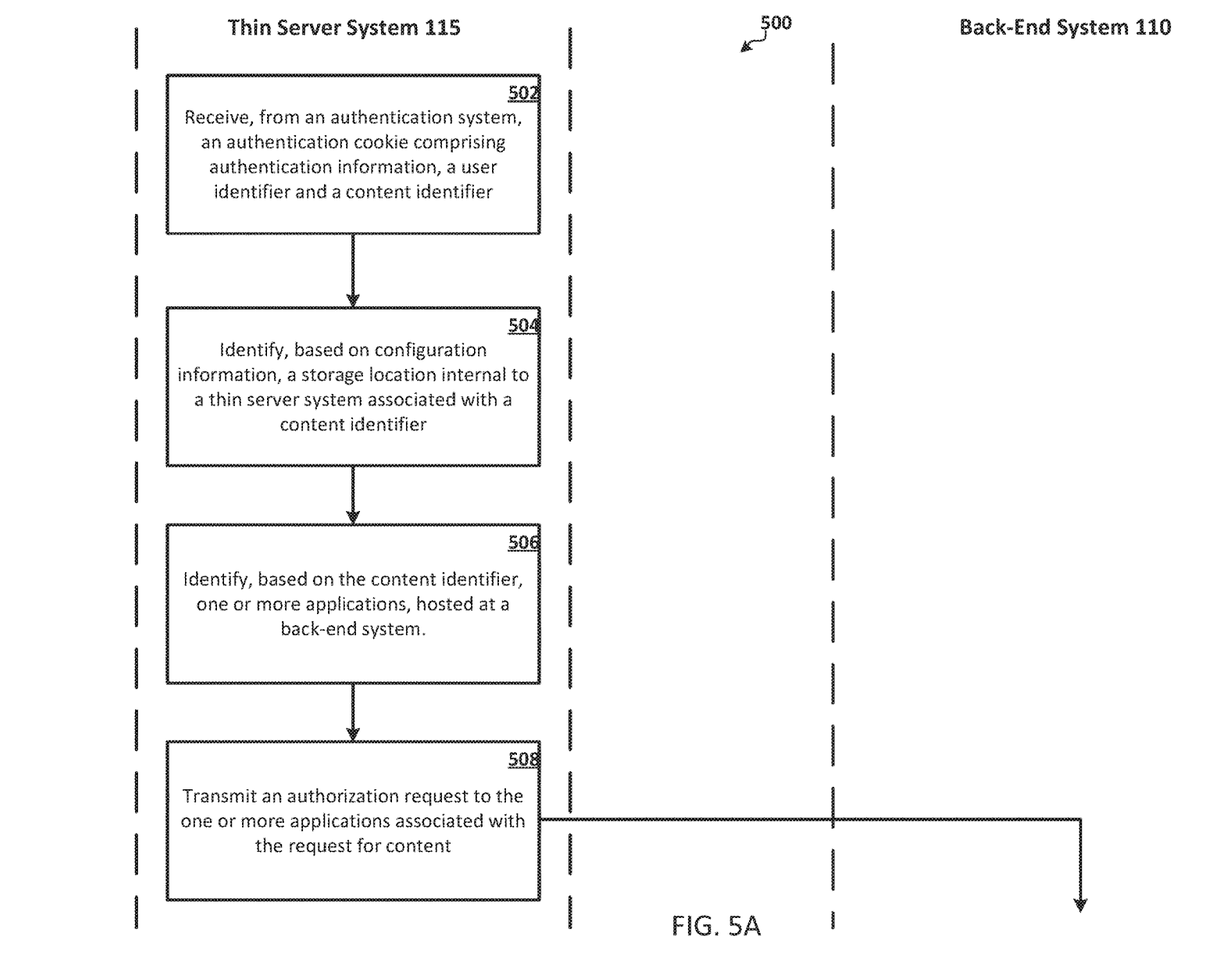
FIG. 5A illustrates an exemplary process according to one or more embodiments described within the disclosure.
Figure 5B:
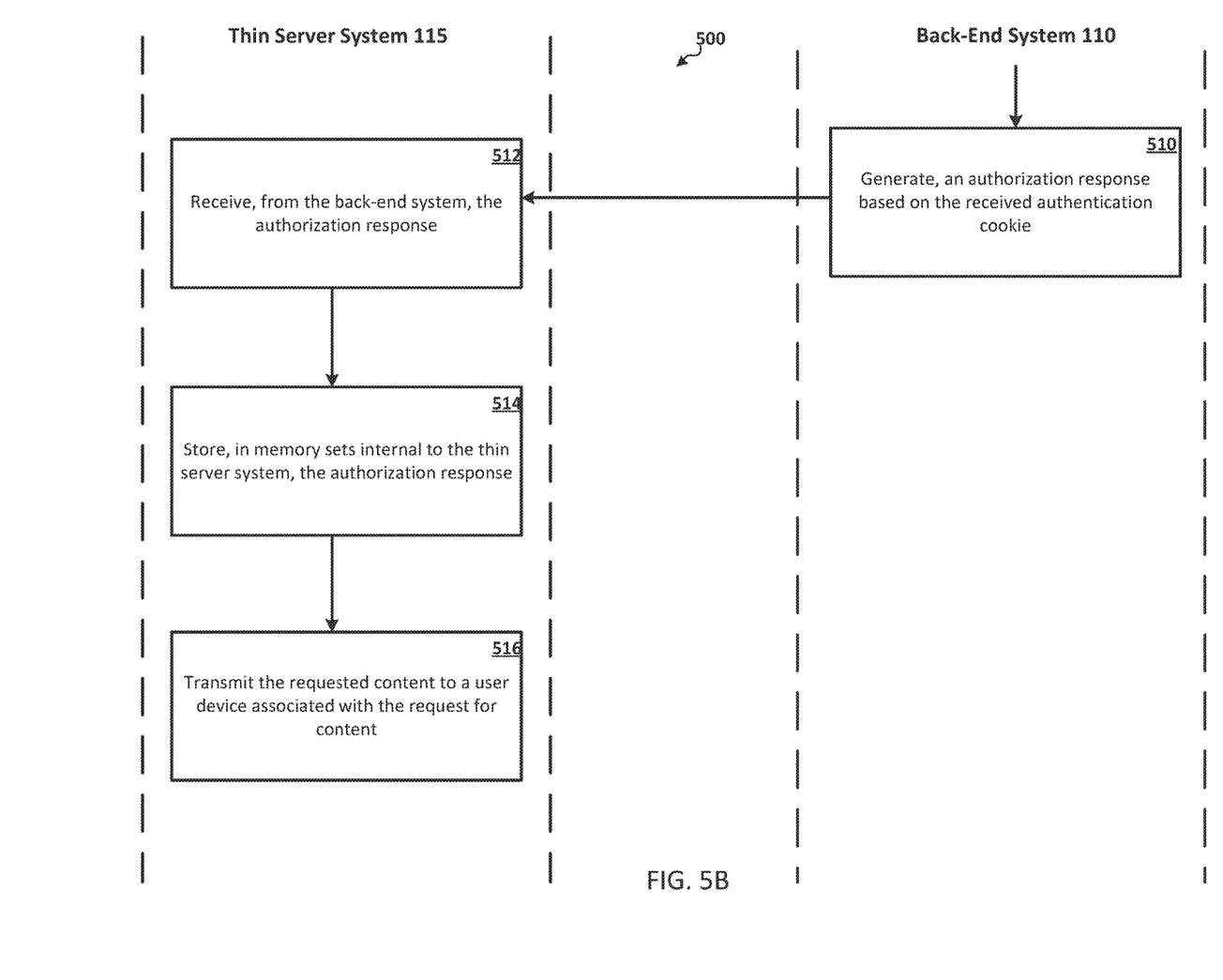
FIG. 5B illustrates an exemplary process according to one or more embodiments described within the disclosure.

FIG. 5 illustrates exemplary process 500 performed by one or more components of interactive system 100. In one embodiment, process 500 may be a process for processing a request for content and subsequently delivering content to user device 125.

At 502, thin server system 115 may receive from authentication system 120, an authentication cookie comprising authentication information, a user identifier, and a content identifier. The authentication information may include an indication of a positive authentication as well as the authentication requirements that were met in determining the positive authentication. In one embodiment, the authentication information may include an indication of a negative authentication. In one embodiment, authentication information may indicate a level of authentication. For example, an application may specify in its authentication requirements that a user may be authenticated by basic means, such as a password and by a more advance means, such as by biometric means. In instances when a user is only authenticated through basic means, the authentication information may indicate a basic level of authentication. The level of authentication may be subsequently used by an application when determining an authorization response after receiving the authentication cookie. A content identifier may be an numerical, alphanumerical, filepath, or other indicator that when received by one or more parts of interactive system 100 may be used to identify content or a plurality of content. A user identifier may identify one a user of user device 125 or user device 125 itself. In one embodiment a user identifier may be a hardware identifier associated with user device 125, a username associated with a user of user device 125, and the like.

At 504, thin server system 115 may identify, based on configuration information, a content storage location internal to thin server system 115 associated with the received content identifier. A configuration file may be a data file, schema, or other form of data that may be utilized by thin server system 115 to identify one or more content storage locations associated with one or more received content identifiers. The configuration file may be stored in one or more memory sets internal to thin server system 115. An exemplary configuration file is illustrated in FIG. 3 and described in corresponding paragraphs.

Thin server system 115 may query internal memory utilizing the received content identifier to locate a matching entry in the configuration file. The configuration file may indicate to thin server system 115 one a piece of content and a content storage location for the piece of content. For example, the received content identifier may be the uniform resource locator (URL) www.webpage.com/calculator. Thin server system 115 may query the configuration file stored in internal memory to find one or more entries corresponding to www.webpage.com/calculator. After locating an entry corresponding to the URL, thin server system 115 determines which piece of content is associated with the URL. In such an instance, the configuration file may indicate that there is a calculator.png file associated with the URL. The configuration file may also indicate which directory or sub-directory the identified piece of content is stored within. In such an instance, the configuration file may indicate that the calculator.png file is stored in a first directory.

At 506, thin server system 115 may identify, based on the received content identifier, one or more applications hosted by back-end system 110. In one embodiment, whenever an application is introduced to interactive system 100 the application may specify to thin server system 115 one or more content identifiers associated with the application. Thin server system 115 may store the content identifiers in internal memory such that the internal memory may be queried to determine which applications are associated with which content identifiers. In one embodiment, a content identifier may be a URL and thin server system 115 may identify an associated application based on the URL. For example, a URL may be www.webpage.com/calculator and thin server system 115 may parse the URL into www.webpage.com. Next, thin server system 115 may query internal memory to determine which application is associated with www.webpage.com. Once the application has been identified, process 500 moves to 508.

At 508, thin server system 115 may transmit an authorization request to the one or more applications associated with the request for content. The authorization request may include the authentication cookie received at 502. Thin server system 115 may transmit the authentication cookie to the application identified at 506.

At 510, Back-end system 110 may generate an authorization response based on the received authentication cookie. An application hosted by back-end system 110 may determine if the user associated with the user identifier received via the authentication cookie at 508 is authorized to access content identified by the content identifier in the authentication cookie. Each application in back-end system 110 may comprise different operation logic (e.g. business logic) to determine authorization. For example, a first application may extract the user identifier, content identifier, and authentication information from the received authentication request. The first application may have stored, in associated memory, an application configuration file similar to the configuration file illustrated in FIG. 3 that describes pieces of content associated with each content identifier. The application configuration file may differ from the configuration file utilized by thin server system 115 in that the application configuration file may include authorization information associated with each content identifier and/or each piece of content associated with the content identifier. In one embodiment, authorization information may include a plurality of user identifiers that are authorized to access one or more pieces of content. For example an application configuration file may be a schema as shown below:

| Content Identifier | Content | Authorized User Identifiers |
|---|---|---|
| www.webpage.com/calculator | calculator.png | jsmith@xyz.com, wthomas@abc.com, missthomas@xyz.com |
| www.webpage.com/calculator2 | calculator.css | jsmith@xyz.com, wthomas@abc.com, missthomas@xyz.com, jones@abc.com |

The exemplary application configuration file indicates all of the user identifiers that are authorized to access pieces of content associated with a content identifier. In one embodiment, the application may compare the received user identifier to the authorized user identifiers to determine if the received user identifier is an authorized user identifier. In one embodiment, a group identifier may be utilized that points to different pieces of content and authorized user identifiers for each of these pieces of content may be different. The exemplary application configured file may be for a single group identifier and indicates jones@abc.com as an authorized user identifier for calculator.css but not for calculator.png. In such an instance, both calculator.png and calculator.css are associated with the same group identifier, but a user may not be authorized to access all content associated with a single group identifier. Such an instance may arise if a portion of a piece of content is secure or has an elevated access level.

In one embodiment, a configuration file may also indicate an authentication level for each content identifier and/or piece of content. For example, calculator.png may require an advanced level of authentication while calculator.css may require a basic level of authentication. In such an instance, the received authentication information may parsed to determine an authentication level associated with a user identifier. Thus, an authentication cookie may not only need to contain a user identifier that is an authorized user identifier, but the authentication cookie must also contain an appropriate authentication level. If the authentication cookie does not contain the appropriate authentication level an authorization indicator may be generated indicating that a user associated with the user identifier is not authorized to access one or more pieces of content.

Once the application determines which parts (if any) a user associated with the user identifier is authorized to access (or which parts the user is not authorized to access), the application generates an authorization response. The authorization response may include the user identifier, the content identifier, and one or more authorization indicators. Each authorization indicator may indicate pieces of content a user identifier is authorized to access (and/or pieces of content a user is not authorized to access). In one embodiment, when a user is authorized to access all content associated with a group identifier, the authorization indicator may include the group identifier. In one embodiment, when a user is not authorized to access all content associated with a group identifier, the authorization indicator(s) may specify which pieces of content the user is authorized to access and/or which pieces of content the user is not authorized to access. The authorization response may then be sent to thin server system 115.

At 512, thin server system 115 receives, from the back-end system 110 hosting the application, the authorization response.

At 514, thin server system 115 stores, in memory sets internal to thin server system 115, the authorization response. In one embodiment, thin server system 115 may store the authorization response within the configuration file such that an additional column may be added to the configuration file to indicate which user identifiers are authorized to access the content. In one embodiment, thin server system 115 may, for each user identifier, store corresponding authorization indicators to indicate which pieces of content a user associated with a user identifier is authorized to access.

At 516, thin server system 115 transmits, to user device 125, the requested content. Thin server system 115 stores content in one or more content storage locations and upon receiving an authorization indicator indicating that a user associated with user device 125 is authorized to access content identified by a received content identifier, thin server system 115 may send the content to user device 125. In one embodiment, user device 125 may, upon receiving the content, store one or more parts of the content. In one embodiment, user device 125 may, upon receiving the content, render and display one or more parts of the content. For example, if the requested content is one or more parts of a webpage, user device 125 may receive an html file. In such an example, user device 125 may then use a web browser to load the html file and produce the web page.

Figure 6:
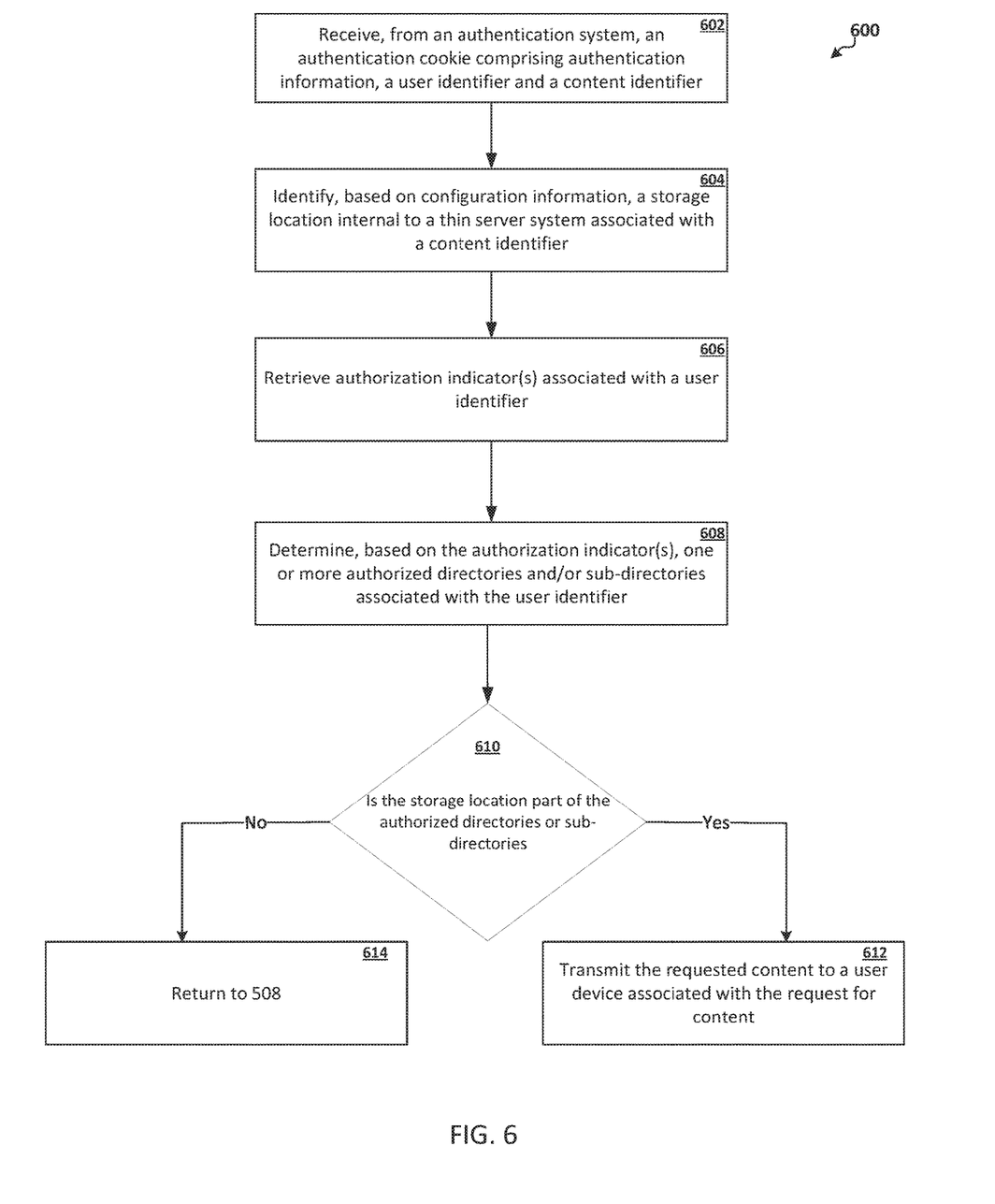
FIG. 6 illustrates an exemplary process according to one or more embodiments described within the disclosure.

FIG. 6 illustrates exemplary process 600 performed by one or more components of interactive system 100. In one embodiment, process 600 may be a process performed by thin server system 115 for processing a request for content according to an authorization hierarchy and subsequently delivering content to user device 125.

At 602, thin server system 115 may receive from authentication system 120, an authentication cookie comprising authentication information, a user identifier, and a content identifier. The authentication information may include an indication of a positive authentication as well as the authentication requirements that were met in determining the positive authentication. In one embodiment, authentication information may indicate a level of authentication. A content identifier may be an numerical, alphanumerical, filepath, or other indicator that when received by one or more parts of interactive system 100 may be used to identify content or a plurality of content. A user identifier may identify a user of user device 125 or user device 125 itself. In one embodiment a user identifier may be a hardware identifier associated with user device 125, a username associated with a user of user device 125, and the like.

At 604, thin server system 115 may identify, based on configuration information, a content storage location internal to thin server system 115 associated with the received content identifier. A configuration file may be a data file, schema, or other form of data that may be utilized by thin server system 115 to identify one or more content storage locations associated with one or more received content identifiers. The configuration file may be stored in one or more memory sets internal to thin server system 115. An exemplary configuration file is illustrated in FIG. 3 and described in corresponding paragraphs.

At 606, thin server system 115 may retrieve, from an internal memory, authorization indicator(s) associated with the user identifier. An authorization response may be previously received from one or more applications hosted by back-end system 110 (e.g., at 512-514). An authorization response may include one or more authorization indicators. Each authorization indicator may indicate pieces of content a user identifier is authorized to access. In one embodiment, when a user identifier is authorized to access all content associated with a group identifier, the authorization indicator may include the group identifier. In one embodiment, when a user identifier is not authorized to access all content associated with a group identifier, the authorization indicators may specify which pieces of content the user identifier is authorized to access.

At 608, thin server system 115 determines, based on the authorization responses, one or more authorized directories and/or sub-directories associated with the user identifier. The configuration file may detail the filepath for each piece of content associated with a content identifier. Thin server system 115 may reference one or more authorization indicators in the retrieved authorization responses to determine one more directories and/or sub-directories a user is authorized to access. In one embodiment, if a user is authorized to access content in a parent directory then the user is authorized to access content in a child directory (i.e. a nested directory). For example, an application may authorize a user identifier access to content in directory 205 as shown in FIG. 2. Authorizing access to content in directory 205 may automatically grant access to content in sub-directories 205A-205D.

At 610, thin server system 115 determines if the content storage location is part of the authorized directories or sub-directories. Thin server system 115 may determine (as indicated at 608) which directories and/or sub-directories a user is authorized to access based on authentication responses associated with the user identifier. Thin server system 115 may compare the content storage location to those authorized directories and sub-directories to determine if the content storage location is within one (i.e. nested) or more authorized directories or sub-directories. If the content storage location does fall within one or more authorized directories or sub-directories, process 600 moves to 612. If the content storage location does not fall within one or more authorized directories or sub-directories, process 600 moves to 614. For example, a user may be authorized to access content in secondary sub-directory 215A as shown in FIG. 2, but the content storage location (as determined at 604) may be within secondary sub-directory 210A. In such an example, the user may not be authorized to access the content storage location and process 600 moves to 614. In another example, a user may be authorized to access content in secondary sub-directory 215A as shown in FIG. 2 and the content storage location (as determined at 604) is within tertiary sub-directory 215B. Tertiary sub-directory 215 is a nested sub-directory of secondary sub-directory 215A. In such an example, the user would be authorized to access the content storage location and process 600 moves to 612.

In one embodiment, a user does not have to be authorized to access all content in a directory or sub-directory in order for the user to be authorized to access all content in a nested sub-directory. For example, 100 pieces of content may be stored in directory 215. In one embodiment, if a user is authorized to access a threshold amount of content (e.g. 1, 10, 50) in a directory or sub-directory, then the same user identifier may be authorized to access all pieces of content in nested sub-directories 215A and 215B.

At 612, thin server system 115 may transmit the requested content to user device 125. Thin server system 115 stores content in one or more content storage locations and upon retrieving an authentication indicator indicating a user associated with user device 125 is authorized to access content in a parent directory, thin server system 115 may send the content to user device 125. In one embodiment, user device 125 may, upon receiving the content, store one or more parts of the content. In one embodiment, user device 125 may, upon receiving the content, render and display one or more parts of the content. For example, if the requested content is one or more parts of a webpage, user device 125 may receive an html file. In such an example, user device 125 may then use a web browser to load the html file and produce the webpage.

At 614, process 600 may go to 508 in process 500. Process 600 may allow thin server system 115 to authorize a request for content based on previously received authorization responses. However, in a circumstance in which there is not a previously received authorization response that authorizes access to requested content then thin server system 115 may transmit an authorization request to one or more applications associated with the request for content. Processes associated with process 500 may be performed in order to retrieve an authorization response from back-end system 110 that is associated with the received content request at 602. Process 600 may improve the efficiency of a computer system by enabling an authorization determination to be made based on previously received information instead of repeatedly requesting authorization from a remote source, which may unnecessarily utilize network resources.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method for dynamic access control comprising:
    receiving, at a thin server system, a request for content, the request comprising a user identifier and a content identifier;
    identifying, based on configuration information, a first storage location for the requested content, the first storage location being internal to the thin server system and the configuration information indicating one or more storage locations associated with the content identifier;
    identifying, based on the content identifier, a back-end system hosting one or more applications associated with the requested content;
    transmitting, by the thin server system, an authorization request to the one or more applications associated with the requested content, the authorization request comprising the content identifier and the user identifier;

receiving, by the thin server system, an authorization response comprising an authorization indicator associated with the user identifier indicating authorization for content within the first storage location;
storing, in non-transitory memory internal to the thin server system, the authorization response; and
transmitting, by the thin server system, the requested content to a user device associated with the user identifier.

2. The computer-implemented method of claim 1, further comprising:
receiving, at the thin server system, a second request for second content, the second request comprising the user identifier and a second content identifier;
identifying, based on the second content identifier, the first storage location as a storage location of the second content;
retrieving, by the thin server system, based on the user identifier, the authorization indicator from the non-transitory memory internal to the thin server system;
verifying, based on the second content being in the first storage location, authorization to access to the second content; and
transmitting, by the thin server system, the second content to the user device associated with the user identifier.

3. The computer-implemented method of claim 1, wherein the content is one or more static data files.

4. The computer-implemented method of claim 1, wherein the first storage location corresponds to a first directory and the content is stored in a sub-directory of the first directory.

5. The computer-implemented method of claim 1, wherein the one or more applications associated with the requested content generate the authorization indicator based on log-in information associated with the user identifier.

6. The computer-implemented method of claim 1, wherein the thin server system comprises a plurality of storage locations and at least two of the plurality of storage locations are associated with different authorization indicators.

7. The computer-implemented method of claim 1, wherein the receiving, at a thin server system, a request for content comprises:
receiving, from a first computer system, an authentication cookie comprising the user identifier, the first computer system being distinct from the thin server system and the back-end system.

8. The computer-implemented method of claim 1, wherein the configuration information indicates at least a first and second directory and the content comprises at least a first part and a second part, the first part of the content being stored in the first directory and the second part of the content being stored in the second directory.

9. A system for dynamic access control comprising:
one or more processors; and
a memory coupled with the one or more processors, the memory configured to
store instructions, that when executed by the one or more processors, cause the one or more processors to:
receive a request for content, the request comprising a user identifier and a content identifier;
identify, based on configuration information, a first storage location for the requested content, the first storage location being internal to a thin server system and the configuration information indicating one or more storage locations associated with the content identifier;
identify, based on the content identifier, a back-end system hosting one or more applications associated with the requested content;
transmit an authorization request to the one or more applications associated with the requested content, the authorization request comprising the content identifier and the user identifier;
receive an authorization response comprising an authorization indicator associated with the user identifier indicating authorization for content within the first storage location;
storing, in non-transitory memory, the authorization response; and
transmit the requested content to a user device associated with the user identifier.

10. The system of claim 9, wherein the instructions, that when executed by the one or more processors, further cause the one or more processors to:
receive a second request for second content, the second request comprising the user identifier and a second content identifier;
identify, based on the second content identifier, the first storage location as a storage location of the second content;
retrieve based on the user identifier, the authorization indicator from the non-transitory memory internal to the thin server system;
verify, based on the second content being in the first storage location, authorization to access to the second content; and
transmit, the second content to the user device associated with the user identifier.

11. The system of claim 9, wherein the content is one or more static data files.

12. The system of claim 9, wherein the first storage location corresponds to a first directory and the content is stored in a sub-directory of the first directory.

13. The system of claim 9, wherein the one or more applications associated with the requested content generate the authorization indicator based on log-in information associated with the user identifier.

14. The system of claim 9, wherein the thin server system comprises a plurality of storage locations and at least two of the plurality of storage locations are associated with different authorization indicators.

15. The system of claim 9, wherein the configuration information indicates at least a first and second directory and the content comprises at least a first part and a second part, the first part of the content being stored in the first directory and the second part of the content being stored in the second directory.

16. A non-transitory computer-readable storage medium having stored thereon instructions for causing at least one computer system to perform the method of:
receiving a request for content, the request comprising a user identifier and a content identifier;
identifying, based on configuration information, a first storage location for the requested content, the first storage location being internal to a thin server system and the configuration information indicating one or more storage locations associated with the content identifier;
identifying, based on the content identifier, a back-end system hosting one or more applications associated with the requested content;

transmitting an authorization request to the one or more applications associated with the requested content, the authorization request comprising the content identifier and the user identifier;

receiving, an authorization response comprising an authorization indicator associated with the user identifier indicating authorization for content within the first storage location;

storing, in non-transitory memory, the authorization response; and transmitting, the requested content to a user device associated with the user identifier.

17. The computer-readable storage medium of claim 16, further comprising instructions that cause the at least one computer to perform the method of:

receiving, second request for second content, the second request comprising the user identifier and a second content identifier;

identifying, based on the second content identifier, the first storage location as a storage location of the second content;

retrieving, based on the user identifier, the authorization indicator from the non-transitory memory internal to the thin server system;

verifying, based on the second content being in the first storage location, authorization to access to the second content; and transmitting second content to the user device associated with the user identifier.

18. The computer-readable storage medium of claim 16, wherein the content is one or more static data files.

19. The computer-readable storage medium of claim 16, wherein the first storage location corresponds to a first directory and the content is stored in a sub-directory of the first directory.

20. The computer-readable storage medium of claim 16, wherein the one or more applications associated with the requested content generate the authorization indicator based on log-in information associated with the user identifier.

* * * * *

UNITED STATES PATENT AND TRADEMARK OFFICE
CERTIFICATE OF CORRECTION

PATENT NO.       : 10,652,332 B2
APPLICATION NO.  : 16/030700
DATED            : May 12, 2020
INVENTOR(S)      : Laursen et al.

Page 1 of 1

It is certified that error appears in the above-identified patent and that said Letters Patent is hereby corrected as shown below:

In the Drawings

On sheet 3 of 7, in FIG. 3, under Reference Numeral 310, Line 1, delete "Indentifier" and insert -- Identifier --, therefor.

In the Specification

In Column 4, Line 9, delete "an a" and insert -- a --, therefor.

In Column 4, Line 14, delete "hmtl" and insert -- html --, therefor.

In Column 7, Line 41, delete "hmtl" and insert -- html --, therefor.

Signed and Sealed this
Twenty-seventh Day of April, 2021

Drew Hirshfeld
*Performing the Functions and Duties of the
Under Secretary of Commerce for Intellectual Property and
Director of the United States Patent and Trademark Office*